United States Patent [19]

Cordell

[11] Patent Number: 4,756,011
[45] Date of Patent: Jul. 5, 1988

[54] DIGITAL PHASE ALIGNER

[75] Inventor: Robert R. Cordell, Tinton Falls, N.J.

[73] Assignee: Bell Communications Research, Inc., Livingston, N.J.

[21] Appl. No.: 946,323

[22] Filed: Dec. 24, 1986

[51] Int. Cl.$^4$ ............................................. H04L 7/00
[52] U.S. Cl. .................................... 375/118; 375/86; 375/95
[58] Field of Search ............... 375/85, 86, 110, 118, 375/119, 95

[56] References Cited

U.S. PATENT DOCUMENTS

| | | | |
|---|---|---|---|
| 3,404,232 | 10/1968 | Burford | 178/70 R |
| 3,851,101 | 11/1974 | En et al. | 375/119 |
| 3,982,184 | 9/1976 | Sanderson | 324/83 |
| 4,010,323 | 3/1977 | Peck | 375/119 X |
| 4,012,598 | 3/1977 | Wiley | 375/119 |
| 4,128,812 | 12/1978 | Pavlis | 328/134 |
| 4,191,998 | 3/1980 | Carmody | 364/200 |
| 4,278,898 | 7/1981 | Rhode | 307/528 |
| 4,376,309 | 3/1983 | Fenderson et al. | 375/110 X |
| 4,543,531 | 9/1985 | Sugita et al. | 375/110 X |
| 4,569,065 | 2/1986 | Cukier | 375/120 |
| 4,604,582 | 8/1986 | Strenkowski et al. | 328/55 |
| 4,611,335 | 9/1986 | Arai et al. | 375/110 |
| 4,637,037 | 1/1987 | Chao | 375/95 X |
| 4,651,108 | 3/1987 | Okita et al. | 375/85 X |
| 4,672,639 | 6/1987 | Tanabe et al. | 375/118 |

FOREIGN PATENT DOCUMENTS

2171577  8/1986  United Kingdom ............... 375/118

*Primary Examiner*—Stephen C. Buczinski
*Assistant Examiner*—Linda J. Wallace
*Attorney, Agent, or Firm*—James W. Falk; Stephen M. Gurey

[57] ABSTRACT

This circuit phase aligns a phase-varying input data stream with a local clock. The incoming data stream is sampled at four quadrature points and these samples are applied to Ex-Or gates to yield four disagreement signals which indicates whether or not a transition from binary 0 to 1, or vise versa, has occurred between any pair of samples. The in-phase (0°) and anti-phase (180°) samples are serially loaded into different but similar shift registers, the taps of which provide the output with earlier or later versions of the input data stream at either 0° or 180°. A control circuit analyzes the disagreement signals and provides control signals which determine which of the shift register taps is connected to the aligner output. The circuit can correct for phase slippage between input data and local clock of up to plus or minus several time slots.

15 Claims, 10 Drawing Sheets

DIGITAL PHASE ALIGNER

BACKGROUND OF THE INVENTION

This invention relates to synchronizing circuitry for digital transmission systems wherein numerous digital channels are required to be phase synchronized with a locally generated clock at a terminal or repeater. The different channels and the local clock will have the same synchronous frequency but may have randomly varying phases caused by traversal of different transmission media and/or different distances. This synchronization facilitates subsequent synchronous processing of the signals, thereby simplifying and improving the reliability of switches and multiplexers which can operate from a single master clock. It also eliminates the need to route a clock with each data channel. In the prior art, approximate phase alignment could be achieved by the matching of transmission line lengths by adding shelf wiring at terminals or repeaters. This expedient does not achieve phase alignment where the different lines may be subject to different temperature cycles, for example from diurnal solar heating which causes different propagational velocities in the different lines which are subject to different amounts of heating.

Another prior art technique of achieving phase alignment comprises the use of a FIFO (first in, first out) register with a Phase Locked Loop arranged to recover the phase-varying clock frequency of the incoming data stream. The recovered clock is used to clock the input data into the FIFO register and the locally generated clock is used to clock it out thereof. This circuitry is expensive both monetarily and in terms of hardware required for its implementation. Also, analog Phase Locked Loops have unacceptably long lock-in times which can cause lost data in high speed operation. Also, a long transition-free period, e.g., a string of 0's or 1's will allow the Phase Locked Loop to drift out of lock.

SUMMARY OF THE INVENTION

An object of the invention is to provide an inexpensive means of phase alignment for synchronous networks where the average clock frequencies are all precisely the same but where incoming digital data streams which have traversed different paths may have different and varying phases of up to plus or minus several time slots. The digital Phase Aligner of the invention is capable of synchronizing the phases of a plurality of such incoming data streams with that of a locally generated clock, so that all channels can be subsequently synchronously processed.

A further object of the invention is to provide phase alignment circuitry which is amenable to all digital implementation in Very Large Scale Integrated (VLSI) Technology and which is also capable of high speed operation.

The Digital Phase Aligner (DPA) is not intended as a replacement for the timing recovery circuit normally found in a receiving regenerator. Such timing recovery circuits are very effective at opening highly degraded signal "eyes" so as to provide the best performance in a transmission system. The DPA is instead intended as a low cost timing alignment device within systems where signals from external transmission systems have already passed through a receiving regenerator. The DPA of this invention can open signal eyes with less than 90 degrees of timing closure, and so may be used for timing recovery in some situations, such as for optical data links in office wiring.

Briefly stated, the design concept of the DPA is based on the observation that if the incoming data signal is sampled at the zero degree(or in-phase) and the 180 degree (anti-phase) points of the local clock, one of these samples will contain the correct data. As the phase relationship between the incoming data and the clock changes, the sampled phase which contains the correct data may also change. The in-phase and anti-phase data are loaded into separate shift registers and the output of a control circuit is used to determine from which shift register tap, or stage, the output is taken. A "quartet sampler" samples the input data stream at 0°, 90°, 180°, and 270° of the local clock, the 0° and 180° samples comprising the in-phase and anti-phase samples. The four samples are time aligned and then adjacent pairs of samples are applied to Ex-Or gates which provide disagreement signals W, X, Y, and Z which indicate whether or not a data transition (a change from binary 1 to binary 0, or vice versa) has occurred between any pair of the samples. A change in the pattern of disagreement signals indicates a slippage in phase between data and clock. The direction of the phase slippage can also be determined by logical analysis of the pattern of disagreement signals. The disagreement signals are applied to the aforementioned control circuit which logically analyzes them and upon phase slippage produces an up or down binary signal which is used to increment or decrement an UP-DOWN counter, the reading of which controls a multiplexer which selects one of the stages or taps of the two shift registers for application to the output. The output selection changes from the in-phase to the anti-phase sample or vice versa within the currently selected bit, thus providing for resolution of one-half of a data bit or time slot. If, for example the input data is retarded in phase because the local clock is running faster than the data, the control logic moves the selected tap to the stage of the opposite shift register representing an earlier point in time, which would be one stage further to the right of its previous position. The output data selection thus alternates between the two registers as it "walks" back and forth in time.

The change in the tap always selects the same input data time slot for connection to the output, but the newly selected output will be derived from samples taken closer to the center of the time slot of the input data. The logic circuit detects when the selected sample point is approaching a data transition due to phase slippage and it then selects the new tap for which the sample point is more closely centered in the same time slot. The selected tap will continue to supply the output until further phase slippage requires another change. The data stream at the selected tap is thus a delayed version of the input data stream but is at the local clock frequency since the local clock operates the shift registers.

An 8-channel DPA embodying this circuitry can be implemented on a single state-or-the art VLSI, 2 micron CMOS chip which requires a minimum of external components. Such an 8-channel DPA can phase align 8 randomly phased incoming channels to a single local master clock and can handle phase excursions of up to plus or minus 4 time slots without error.

An object of the invention is to provide a digital phase aligner in which it is unnecessary to recover the clock from incoming asynchronous digital data streams, or to utilize phase locked loops or FIFO registers.

A further object of the invention is to provide a DPA that can be implemented with all-digital circuits as that low-cost VLSI Technology can be employed.

A further object of the invention is to provide a DPA which is robust in the presence of data noise and inter-symbol interference and has several defenses against flip-flop metastability, thus facilitating high speed operation.

A still further object of the invention is to provide a digital phase aligner in which an incoming data stream is sampled at four points 0°, 90°, 180°, and 270° of a local clock and the in-phase (0°) and anti-phase (180°) samples are loaded into different halves of a biphase register and in which a control circuit determines the relative phase of the input data stream relative to said local clock by logical analysis of said four samples and selects a stage of said biphase register for application to an output depending on the results of said logical analysis.

These and other objects and advantages of the invention will become apparent from the following detailed description and the drawing.

DETAILED DESCRIPTION

Figure 1:
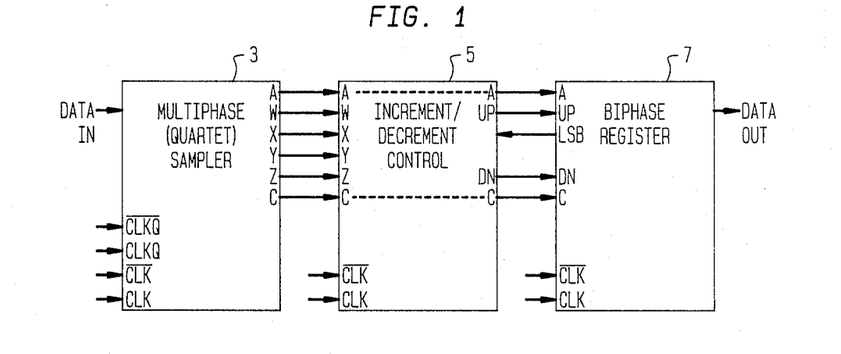
FIG. 1 is a block diagram of each channel of a multi-channel digital phase aligner of the invention.

The block diagram of FIG. 1 shows the circuitry of each channel of a multi-channel digital phase aligner, and it comprises the Multiphase (or quartet) sampler 3 which has the input data stream applied thereto, as well as four quadrature clock phases, $\overline{CLKQ}$(270°), CLKQ(90°), $\overline{CLK}$(180°), and CLK(0°). The A and C outputs of the sampler 3 are the in-phase and anti-phase data samples, respectively. The four binary digital signals W, X, Y and Z are the four disagreement signals produced by the quartet sampler. They indicate when time-adjacent quadrature samples of the input data disagree, thus pointing to the time location of input data transitions. The inputs of the Increment/Decrement control circuit 5 are the aforementioned signals A, W, Y, Z, C, $\overline{CLK}$ and CLK. The A and C signals simply pass through the circuit 5 to the Biphase Register 7. The control circuit 5 produces binary UP or DN signals which increment or decrement the UP/DOWN counter which is part of the Biphase Register. The LSB signal is the least significant bit of the UP/DOWN counter and this is fed back to the control circuit 5 to indicate whether the currently selected sample is in-phase(A) or anti-phase(C).

Figure 2A:
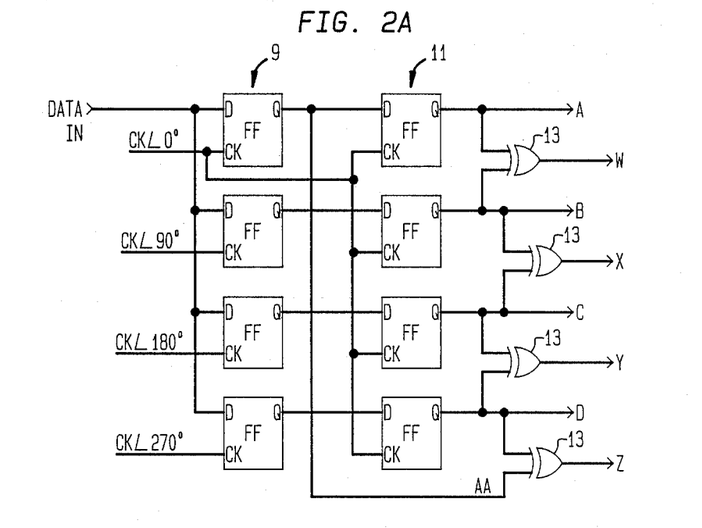
FIG. 2a is a simplified diagram of a multiphase or quartet sampler and FIG. 2b are waveforms illustrating the operation thereof.

The simplified multiphase or quartet sampler of FIG. 2a comprises two columns of four D-type Flip-Flops, 9 and 11. Each of the Flip-Flops (FFs) of column 9 has its D input connected to the input data stream, as shown, and each of these FFs is clocked by a different quadrature phase of the locally generated clock. These clock phases are the same as those applied to the sampler 3 of FIG. 1. The second column, 11, of four identical FFs all have their D inputs connected to the Q outputs of the corresponding FFs of column 9, and all four of these FFs of column 11 are clocked by the in-phase clock, as shown. Thus, the FFs of column 11 produce at their Q outputs the four time-aligned quadrature samples of the input data stream. These samples will thus be either binary 1 or 0 depending on the binary state of the input data when the FFs of column 9 were clocked. The four quadrature samples at the outputs of the FFs of column 11 are designated A, B, C and D corresponding to the four clocking phases of 0, 90, 180 and 270 degrees, respectively. Each of the Exclusive-Or (Ex-Or) gates 13 have as inputs the outputs of a different pair of phase adjacent samples from the FFs of column 11. The outputs of the gates are the four disagreement signals W, X, Y and Z. A binary 1 disagreement signal indicates that a data transition, as previously defined, occurred between the taking of the two quadrature samples represented at the Ex-Or gate input, and a binary 0 output represents the absence of such a data transition. Thus, the signal W represents the modulo-2 addition of the A and B samples, the signal X the modulo-addition of the B and C samples, the signal Y the same type of addition of the D and the AA sample. Note that the AA sample is the 0° sample of the next data bit since it is taken from the output of the FF in column 9.

Figure 2B:
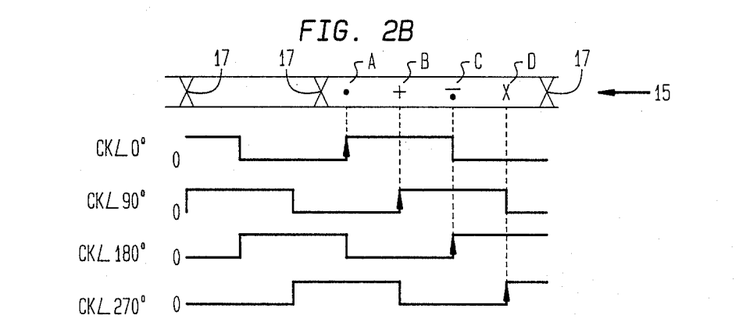

FIG. 2b shows a data signal 15 represented by a pair of parallel horizontal lines connected by Xs 17, which represent data transitions. The illustrated signal is of the non-return to zero type in which a binary 1 would be represented by one voltage level, e.g., a positive voltage represented by the upper horizontal line, and a binary 0 by the other horizontal line which would normally be zero voltage. The downwardly sloping portion of each data transition or X, as one travels to the right, represents a transition from 1 to 0 and the upwardly sloping portion the opposite transition. FIG. 2b shows the four quadrature-phased local clock signals in their proper relative phases. As shown, the samples are taken by the FFs of column 9 on the positive-going transitions of each of the clock signals. The sampling points within the data 15 are labeled A,B,C and D corresponding to the output signals of FIG. 2a. These four quadrature sampling points are identified in this and subsequent figures herein by the symbols shown within data stream 15. These symbols are a dot (.) for 0°, a plus sign (+) for 90°, a bar-dot (∹) for 180°, and the letter (x) for 270°.

Figure 3:
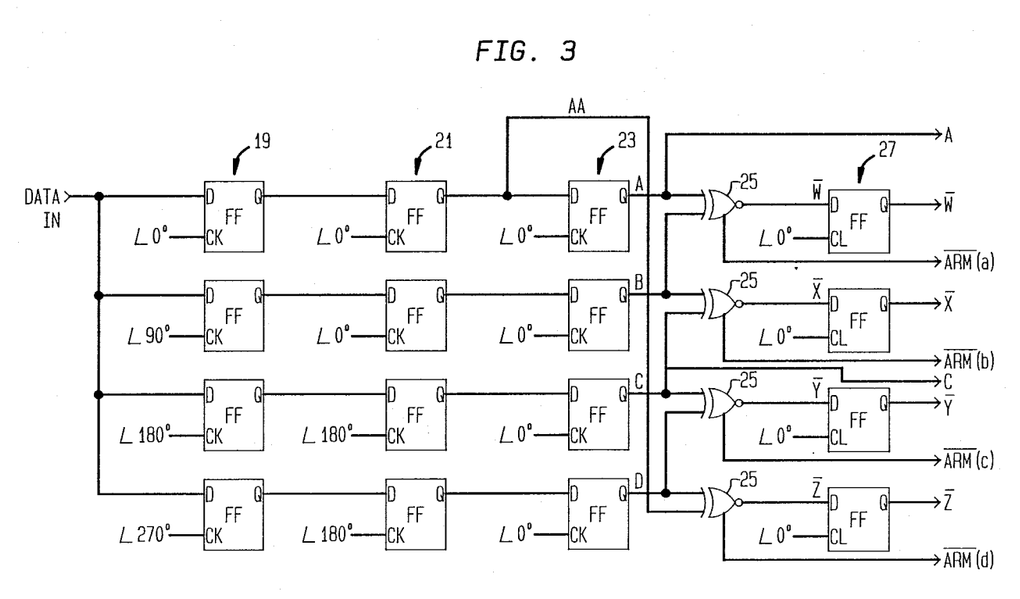
FIG. 3 is a block diagram of a more sophisticated quartet sampler which includes additional features to provide higher speed operation and greater immunity to metastability effects.

FIG. 3 shows a practical implementation of a quartet sampler which includes additional features which facilitates high speed operation. Three columns of FFs, 19, 21, and 23 are used here to perform the initial sampling and the subsequent time-alignment. The added column of FFs permits a minimum one-half sample time between the clocking of each column of FFs. This facilitates high speed operation and makes the sampler more immune to flip-flop metastability. Note that the signal AA is the next zero degree sample and is thus phase-adjacent to the current 270° sample (D) at the output of the lower most of the FFs of column 23. The $\overline{ARM}$ signals are part of a metastability defense and they operate by modifying certain switching thresholds in the gates 25 when the control circuit of FIG. 1 is in a certain state. The Ex-Nor gates 25 perform the complement of the modulo-2 addition function and thus the outputs thereof will be the complements ($\overline{W}, \overline{X}, \overline{Y}, \overline{Z}$) of the corresponding disagreement signals of the circuit of FIG. 2a.

The circuit of FIG. 3 operates like that of FIG. 2a, with the input data applied to the D-inputs of all FFs of the first column 19, which FFs perform the actual sampling. In column 21 the two upper FFs are clocked by the 0° clock and the two lower ones by the 180° clock. All of the FFs of column 23 are clocked by the 0° clock. This circuitry provides the aforementioned minimum on one-half sample time (or 180°) between the clocking of any adjacent FFs in each of the four rows. This means that the FFs all have at least one half of a bit period to settle down before subsequent clocking. Each of the gates 25 has its output connected to the D-input of a FF 27, which merely provides a one time slot pipeline delay for the disagreement signals.

Figure 4:
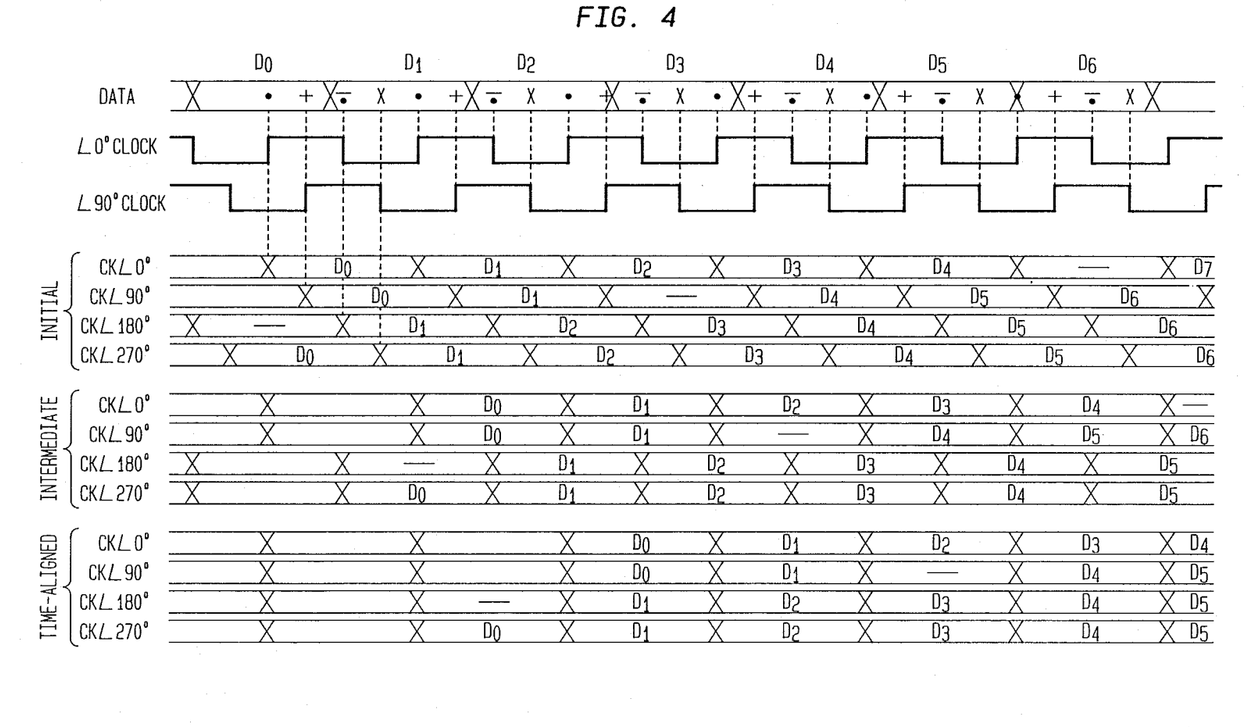
FIG. 4 is a series of waveforms illustrating the operation of the circuit of FIG. 3 when data is slipping relative to clock.

The diagram of FIG. 4 illustrates how the sampler of FIG. 3 operates when the data period is less than the local clock period (clock slow), and how the multiphase samples are taken and then time-aligned by the three columns of FFs. The upper row labeled "Data" shows 7 data bits, $D_0$-$D_6$. The next two rows are labeled 0° clock and 90° clock. The in-phase (A) samples are taken on the positive-going transitions of the 0° clock and the anti-phase (C) samples on the negative-going transitions thereof. The 90° or B samples are taken on the positive-going transitions of the 90° clock and the 270° or D samples on the negative-going transitions thereof. The four rows labeled "Initial" show the Q outputs of the first column of FFs 19 of FIG. 3. It can be seen that a data transition (from $D_0$ to $D_1$) occurred between the 90° and 180° sampling points. Also, where a sampling point occurs at a data transition the data bit is ambiguous and is denoted by a dash (-). Note that the intermediate group of samples has the upper two rows time-aligned to the 0° clock and the lower two rows time-aligned to the 180° clock due to the clocking arrangement of FIG. 3. The time-aligned outputs of the third column of FFs, 23 show ambiguous samples at 90° and 180° and the 0° samples would show an ambiguous bit if the waveform continued one more bit to the right. Thus, only the 270° samples are valid versions of the input data over this six-bit interval. Also, it should be noted that the 0° sampling point has slipped from nearly the mid-point of the data time slot at $D_0$ end of the time slot at $D_5$, due to the difference in the clock and data rates. The function of the remainder of the circuitry is to select either the time-aligned in-phase or anti-phase sample for connection to the output, without any loss of data bits due to phase slippage or any errors due to ambiguous sampling at or near data transitions. Note that the data/clock slippage rate depicted in FIG. 4 is much greater than the DPA is required to handle in practice.

Figure 5:
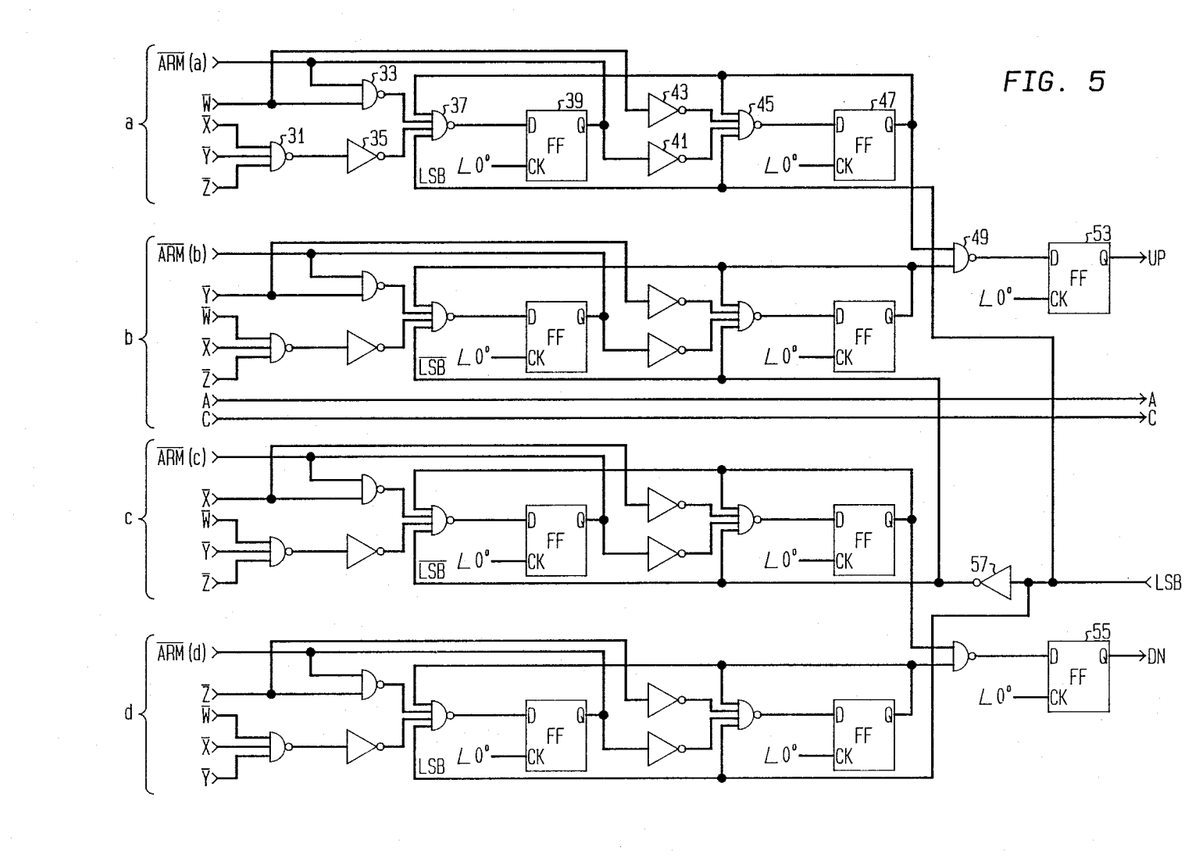
FIG. 5 is a logic diagram of the Increment/Decrement control circuit of FIG. 1.

FIG. 5 is a logic diagram of the Increment/Decrement control circuit of FIG. 1. This logic circuit analyzes the patterns of disagreement signals from the quartet sampler and produces the UP and DN signals which are applied to the counter of the Biphase Register, to vary the shift register tap from which the output is taken. Because the phase relationship between data and local clock are assumed to be changing slowly, decisions to change the selected shift register taps can be allowed to take some time. In fact, a bit of careful "deliberation" on the part of the control circuit is desirable in light of the possibility of metastability effects that can occur at high speeds where an appreciable part of a data or clock period may be required to change voltage levels. Thus, in order to provide a defense against erroneous decisions, the control circuit is more complex than necessary to merely carry out the fairly simple algorithm required to achieve phase alignment. The control circuit of FIG. 5 comprises four essentially identical control channels labeled as a-d, each channel handling actions corresponding to a different one to the four types of disagreements. The upper channel, a, takes action on legitimate scenarios involving $\overline{W}$ disagreements, which call for an count if in-phase (A) samples are currently being taken. To produce the UP count the control channel, a, requires two sequential $\overline{W}$ type disagreements without any intervening disagreements of any other types. Channel "a" of FIG. 5 comprises NAND gate 31 with inputs $\overline{X}$, $\overline{Y}$ and $\overline{Z}$ which are the disagreement signals of all other types except $\overline{W}$. The output of gate 31 is inverted by inverter 35. The signal $\overline{W}$ forms one input of NAND gate 33, the other input of which is the $\overline{ARM}$ a signal from the Q output of FF 39. The $\overline{W}$ signal is also applied to inverter 43. The NAND gate 37 has as its four inputs the Q output of FF 47, the output of NAND gate 33, the output of inverter 35 and the LSB output from the UP/DOWN counter of the Biphase Register. When LSB=0 the anti-phase or 180° samples are being applied to the output from the Biphase Register and when LSB=1 the in-phase samples are selected for application to the output. The Q output of FF 39 is applied to inverter 41. The four inputs of NAND gate 45 are, the outputs of inverters 41 and 43, the Q output of FF 47, and LSB. The output of gate 45 is applied to the D input of FF 47.

The operation of channel "a" is as follows. If there is a $\overline{W}$ disagreement, W=0 and X, Y, and Z will all be binary 1. The Q output of FF 39 will be normally high so that $\overline{ARM}$a=1. The first W disagreement arms the channel by causing FF 39 to go low. Feedback from FF 39 to gate 37 latches the circuit into the armed state. Any subsequent disagreement of another type will cause either X, Y or Z to go to binary 0 which will disarm the channel by causing FF 39 to go back high at the next clock pulse. Also FF 39 will become armed (go low) only if LSB=1, indicating that in-phase samples are being taken. If the circuit is still armed (FF 39 low) when the next W disagreement occurs, FF 47 will be clocked into the low or 0 state, causing a binary 1 to appear at the UP terminal at the Q output of FF 53. The NAND gate 49 has as inputs the Q output of FFs 47 and 51. The low state of FF 47 will cause FFs 39 and 47 to go high or binary 1 on the next clock cycle since the Q output of FF 47 is one input of both gates 37 and 45, and binary is at both of these inputs are required to maintain these two FFs in the low states. This prevents multiple counter incrementing even though the W disagreements persist after the tap change. Also, the UP signal will cause LSB to go to "0" which also disarms channel a by preventing FF 39 from going to binary 0, but only after some pipelining delay.

The circuitry and operation of the other channels b-d of FIG. 5 are identical to the one described. Channel b processes Y disagreements when $\overline{\text{LSB}}=1$ and the anti-phase samples are being selected. Channel b will produce an UP signal at the output of FF 53 if two sequential Y disagreements are detected with no intervening disagreements of any other type.

Similarly channel c processes X disagreements when $\overline{\text{LSB}}=1$ and channel d processes Z disagreements if LSB=1. Both of these channels produce down (DN) signals at the output of FF 55. The inverter 57 produces signals $\overline{\text{LSB}}$ from the LSB signal fed back from the UP/DOWN counter of the Biphase Register.

Figure 6:
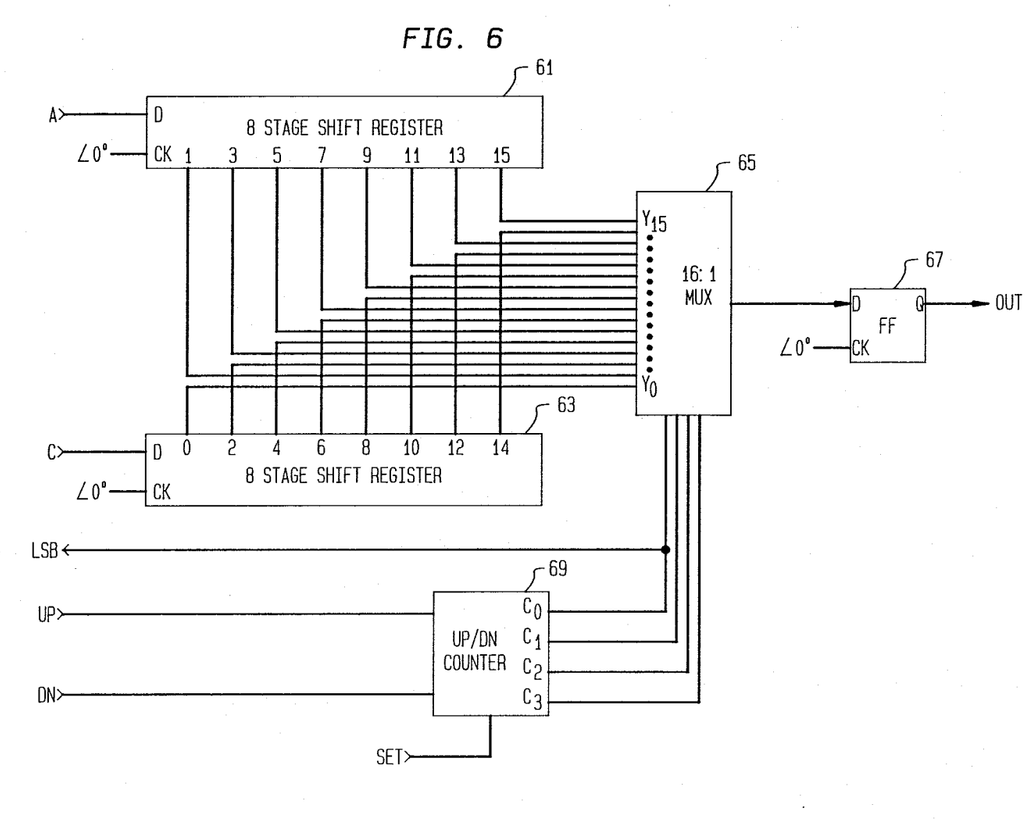
FIG. 6 is a logic diagram of the Biphase Register of FIG. 1.
Figure 7:
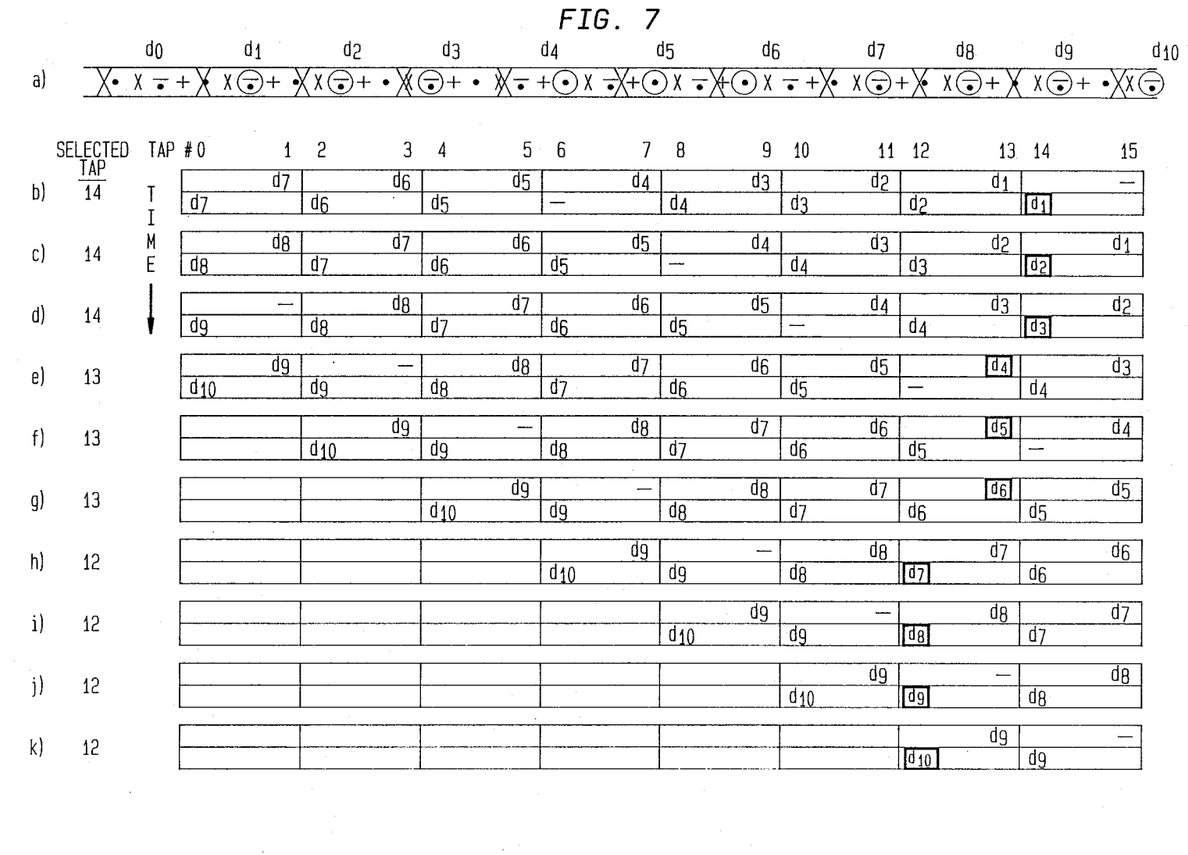
FIG. 7 is a diagram illustrating the operation of the DPA when the local clock is fast relative to the data showing contents of the Biphase Register as a function of time.

The Biphase Register 7 of FIG. 7 is shown in greater detail in FIG. 6. It consists of two 8-stage shift registers 61 and 63. The register 61 receives at its serial input D the in-phase or A time-aligned data samples from the quartet sampler and the shift register 63 the anti-phase time-aligned samples from the same source. The UP/DOWN signals from the Increment/Decrement control circuit of FIG. 5 are applied to 4-bit binary UP/DOWN counter 69. The binary outputs $C_0$–$C_3$ of the counter determine which of the 16 pk register taps 0–15 is selected by 16 to 1 Multiplexer 65. The Multiplexer output is applied to delay FF 67, the Q output of which is the selected and synchronized data bit. A signal applied to the set input of counter 69 will reset it to the approximate middle of its range (1000), so that phase excursions of ≠4 data bits can be accommodated, in steps of one-half of a data bit period. If phase excursions exceed this range, the counter is designed to "wrap" back to the center of its range instead of wrapping around. When the range is exceeded in either direction, a slip detector can provide an indication thereof. The counter output $C_0$ is fed back to the control circuit as signal LSB. Note that all clocking in the Biphase Register is at 0°. Note that register taps further to the right store samples taken earlier in time. As the count increases from 0 to 16, for example, earlier and earlier samples, in one-half time slot increments, are selected.

FIG. 7 illustrates the operation of the Digital Phase Aligner when the clock is running fast relative to the data and shows what data is loaded into each of the shift registers at several successive points in time. Row "a" indicates a sequence of 11 data bits with the four quadrature sampling points identified therein with the symbols previously described. The rows of boxes b-k indicate which data bits of row "a" are stored in which register stages as a function of time. The 16 shift register stages are listed as Tap #s 0–15 from left to right, with the odd-numbered taps containing in-phase (A) samples from register 61 and the even-numbered taps containing anti-phase (C) samples from register 63. This represents the physical arrangement of the upper (61) and lower (63) registers of FIG. 6, with data clocked from the left end. Thus the last (most recent) data appears at taps 0 and 1 and came from the data sample time containing d7 for both the A and C samples. Thus in the boxes of rows b-k, time proceeds from the right to left instead of left to right as in row "a". In row "a", the selected samples are shown circled. The corresponding shift register taps selected for connection to the output via multiplexer 65 are listed as a function of time in the column on the left entitled "Selected Tap". The selected data in the shift registers are shown inside rectangular boxes. Data bits d1–d3 are selected from the anti-phase samples of tap 14. It can be seen that the anti-phase samples are drifting toward the left in row "a" and are approaching the data transition at d3, while at the same time the in-phase sample A is approaching the center of d3. Thus the logic switches the selected sample to the in-phase or A sample at tap 13 for data bit d4, where it continues until data bit d6. Starting at d7 the anti-phase sample in again selected at tap 12. Since the data is coming slower than the clock in this example, the tap address is gradually moving to the left to select later data. These tap changes are accomplished by decrementing the counter 69.

Figure 8:
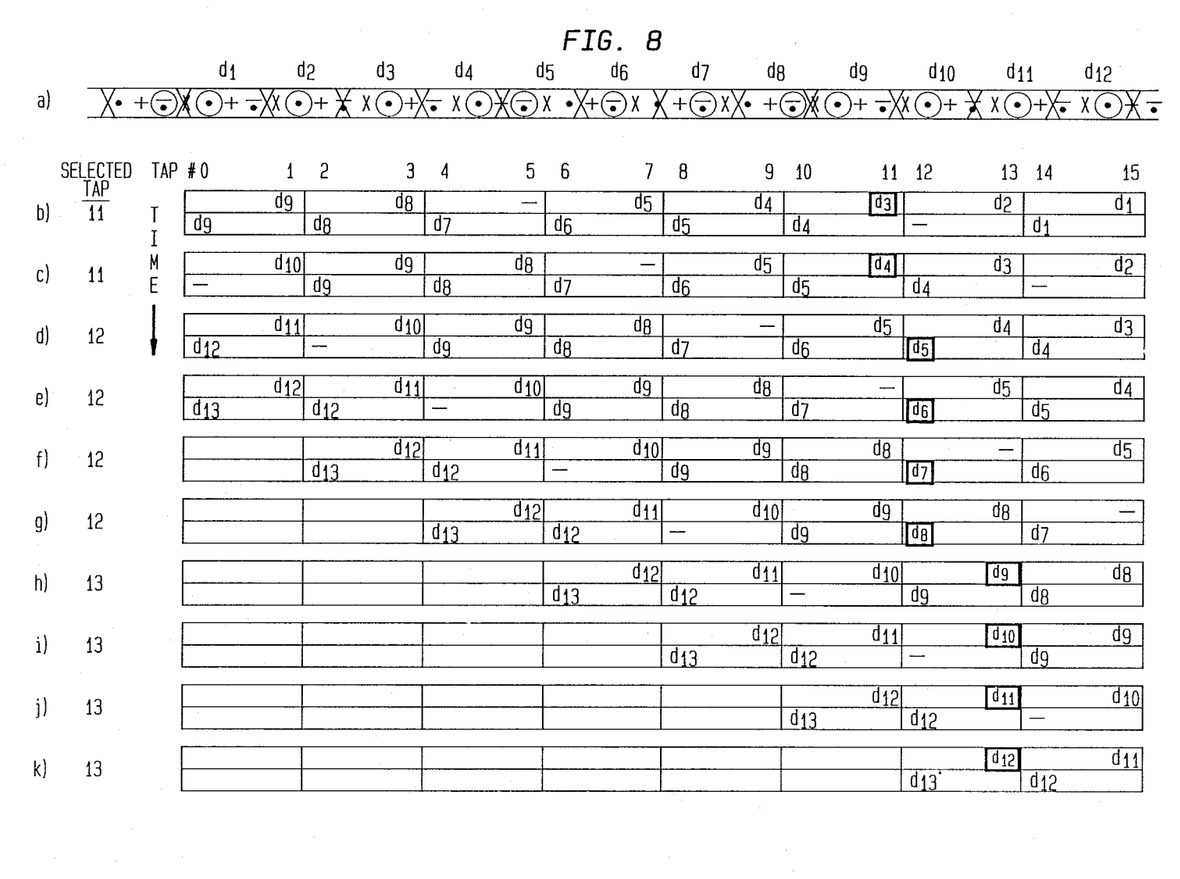
FIG. 8 is a diagram illustrating the operation of the circuit when the clock is slow relative to the incoming data stream.

FIG. 8 is a similar diagram which shows what happens when the clock is slow relative to the data. In this case the counter is being continually incremented so that the data samples are being taken from earler points in time represented by the data at the higher numbered taps.

Figure 9A:
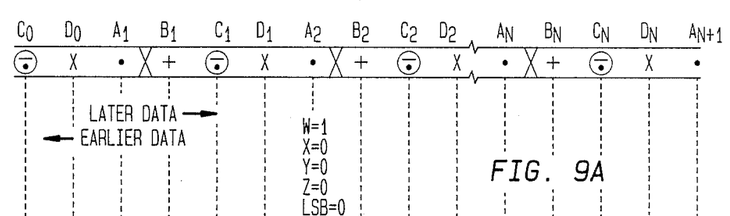
FIG. 9 are diagrams showing how the control circuit functions for various data/clock time relationships when the least significant bit of the UP-DOWN counter is binary 0.
Figure 9B:
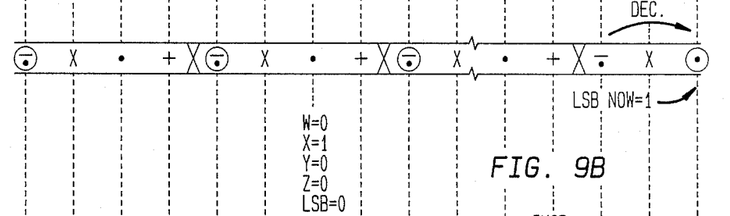
Figure 9C:
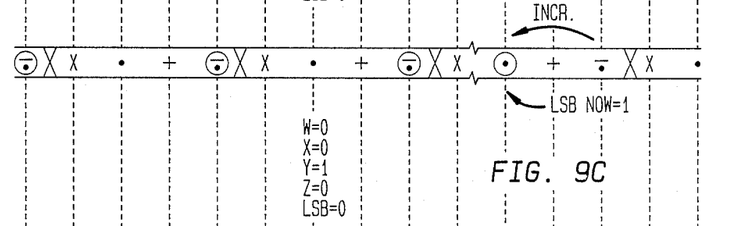
Figure 9D:
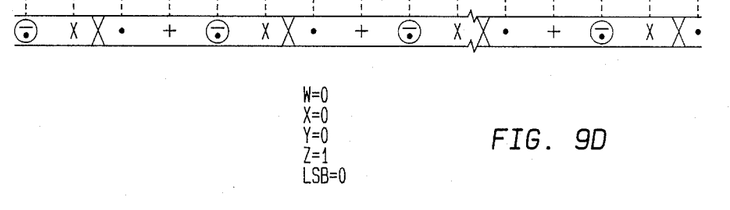
Figure 10:
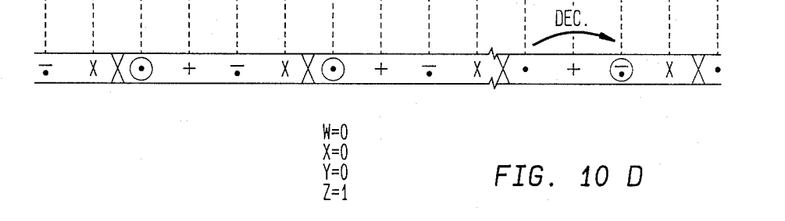
FIG. 10 shows how the control circuit functions when this bit is binary 1.

FIGS. 9 and 10 further illustrate the operation of the circuit and its algorithm. FIG. 9 shows four possible combinations of disagreements and the action taken when the sample currently being taken from the shift register is the anti-phase data. Under these conditions the counter output is even and thus LSB=0. In FIGS. 9 and 10 the quadrature data sampling points are labeled $C_0$, $D_0$, $A_1$, $B_1$, $C_1$, etc. In FIG. 9a it can be seen that the W disagreement results from the fact that the 0° (A) and 90° (B) samples are on opposite sides of a data transition, and all other pairs of samples are within each data time slot, thus W=1 and X=Y=Z=0. Referring back to channel "a" of FIG. 5, the LSB=0 input to gate 37 will prevent the arming and operation of this channel and thus no action will be taken. The samples will continue to be anti-phase, as shown. Note that these C samples are all approximately centralized within the data time slot and thus no action is required. In FIG. 9d the A and D samples are on opposite sides of the data transition and all other pairs of adjacent samples are within the data bits, therefore Z=1 and W=X=Y=0. Again the LSB=0 bit applied to the two four-input NAND gates of channel d in FIG. 5 will prevent the arming and operation of channel d and thus no action will be taken. The selected sample will continue to be the C sample which as seen in FIG. 9d is approximately centrally located within the data bits, or time slots.

FIG. 9b shows the situation where the B(90°) and C(180°) samples are on opposite sides of the data transition and thus X=1 and W=Y=Z=0. It can be seen that in this situation the selected anti-phase sample is approaching a data transition and the in-phase samples are all close to the data time slot centers. This thus requires a change of samples from C to A. Since the currently selected C sample is near the beginning of the data time slots, the later A sample must be selected to avoid loss of data. Later samples are selected by decrementing the counter. The logic of channel c of FIG. 5 accomplishes this. Note that $\overline{\text{LSB}}$ signal of channel c will be binary 1 since LSB=0. Thus both of the four input NAND gates will be enabled to produce a DN signal from FF 55. This DN signal will decrement the counter 69 of FIG. 6 and move the selected tap to the in-phase register 61. This DN signal will shift the selected tap from an even tap on register 63 to the next lower numbered (later tap samples) which will be on the register 61, thus shifting the selected data bit one-half of a bit period later in time. This shift is seen on the right side of FIG. 9d, the curved arrow labeled "DEC" indicating that the selected sample moves from the anti-phase sample near the data transition to the in-phase sample which is within the same time slot but is more or less centrally located therein. Thus this shift does not change the output data but only the position of the data sample within the data time slot. Note that after the shift the disagreement pattern will still be the same as before the shift, however LSB will now be binary 1 so $\overline{LSB}=0$ and channel c will be disabled from generating further DN signals.

Figure 10A:
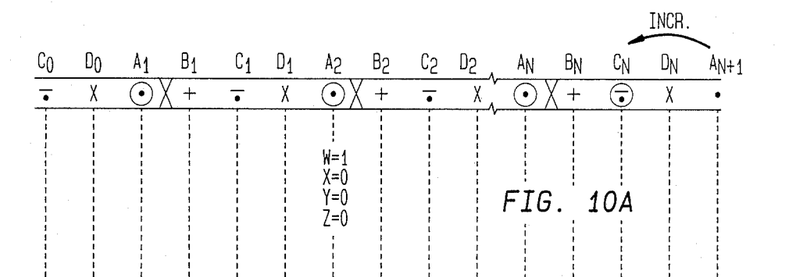
Figure 10B:
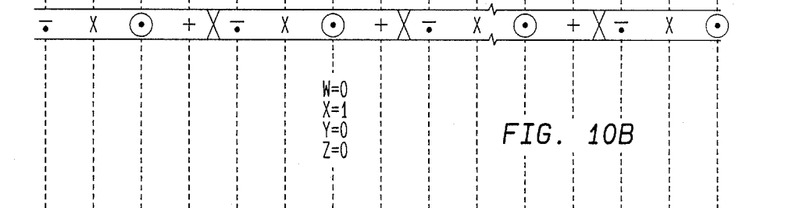
Figure 10C:
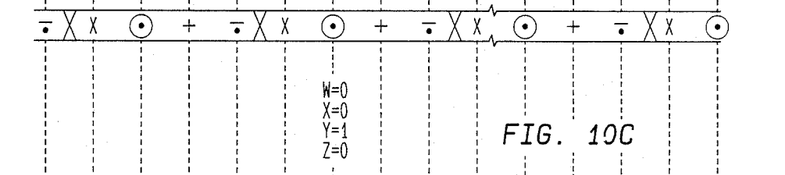
Figure 11A:
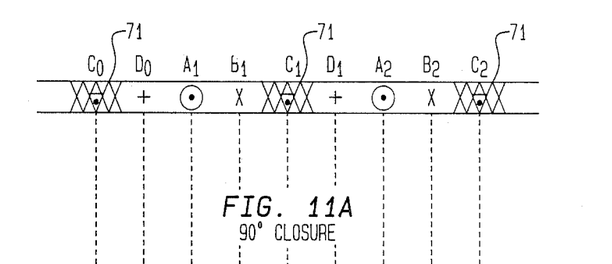
FIG. 11 illustrates the operation of the circuit under different conditions of signal eye closure.
Figure 11B:
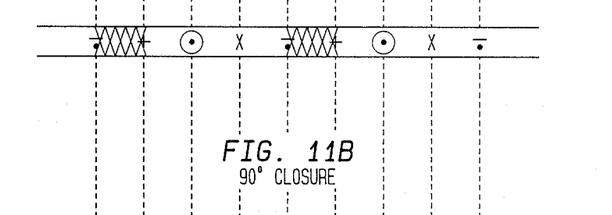
Figure 11C:
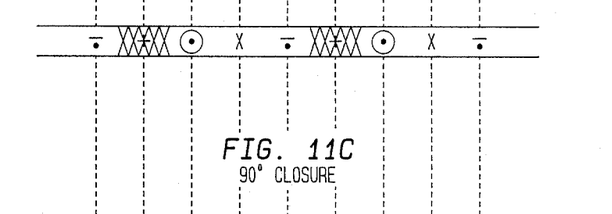
Figure 11D:
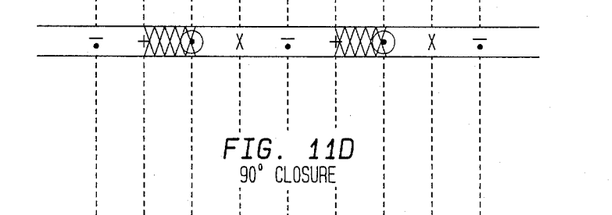
Figure 11E:
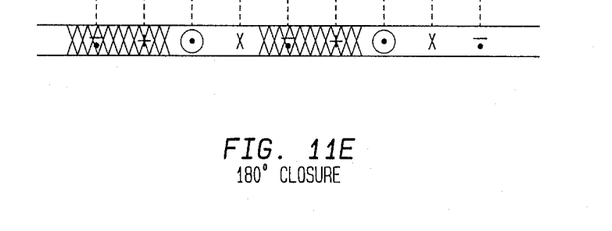

FIG. 10 is similar to FIG. 9 but illustrate four situations in which the sample initially being taken is the in-phase or A sample and hence LSB=1 and $\overline{LSB}=0$. In FIG. 10a the A and B samples are on opposite sides of the data transitions and hence W=1 and X=Y=Z=0. Since LSB=1 channel a of FIG. 5 will be enabled and the FF 47 will produce an UP signal from FF 53 which signal will increment counter 69 by one count to switch the selected sample to the anti-phase sample from register 63. Thus the earlier anti-phase sample $C_n$ which is near the middle of the date bit will be supplied to the output in FIG. 6 and at the same time the LSB will be switched to 0, inhibiting further counter action. In the situation of FIG. 10b, X=1 since the 90° and 180° samples disagree and W=Y=Z=0. Since LSB=0 channel c of the control circuit will be inhibited and no action will be taken. Likewise in FIG. 10c wherein Y=1 and X=W=Z=0, channel b of the control circuit will be inhibited since $\overline{LSB}=0$ and the two four-input NAND gates will not function to arm and operate the circuit.

In FIG. 10d wherein Z=1 and W=X=Z=0 channel d will enabled since LSB=1 and a DN signal will be produced by FF 55 which decrement counter 69 by one count to shift the selected sample to the anti-phase sample of a later time, indicated by the curved arrow labeled "DEC".

It is apparent from the diagram of FIGS. 9 and 10 that if the currently selected sample has quadrature samples on either side thereof within the same time slot, as in FIGS. 9a and 9d, no action is taken by the logic circuit since the selected sample point is approximately centered in the time slot. If the selected sample point is located near the beginning of each time slot, as in FIG. 9b, the logic switches to the oppositely phased later sample which is approximately in the middle of the time slot. This requires a single count decrement of the counter. Decrementing the counter moves the selected tap to the left in FIG. 6 and represents a later time equal to one half of a bit period. Conversely, when the currently selected sample is near the end of a time slot as in FIG. 9c, the logic switches to the oppositely phase sample of an earlier time which requires incrementing the counter by one count. Thus the control algorithm produces a change in sample selection (an increment or decrement of the counter) if the current sample disagrees with either adjacent quadrature sample.

Binary digital signals are subject to signal eye closure, which is illustrated in FIG. 11. Eye closure is caused by intersymbol interference and timing jitter. Note that in FIG. 11a each transition 71 is characterized by several Xs spread over an appreciable portion of the data bit. This can occur when high speed jitter causes the transition to rapidly bounce back and forth in time. Such jitter will produce on an oscilloscope screen multiple Xs such as those illustrated due to the persistence of vision. Thus within these closed eye portions of the signal, any sample will be ambiguous and cannot be used for control purposes in any circuit like the present one. Since in the present circuit the samples are 90° apart, any eye closure up to 90° can be tolerated. In FIGS. 11a and 11b, both the quadrature samples which are adjacent to the selected in-phase (A) sample are outside of the eye closure and the logic circuit will not be adversely affected. In FIG. 11c the 270° sample (D) adjacent to the selected in-phase sample is within the ambiguous portion of the signal and the binary value of D will therefore bounce back and forth between agreement and disagreement with the selected in-phase sample. This may cause the logic circuit to bounce back and forth between the in-phase and anti-phase samples, however this will cause no errors or loss of data since the bouncing back and forth always takes place within the same valid data time slot. With eye closures of more than 90°, the circuit becomes unreliable. FIG. 11e shows a closure of approximately 180°. This will render ambiguous two out of four quadrature samples and can result in two disagreements on opposite sides of a valid sample, leading to the selection of invalid samples. This situation is shown in FIG. 11e.

It is apparent that the Biphase Register may be modified to accommodate greater phase slippage. For example, each of the shift registers can be provided with 16 stages. This would require 32 to 1 multiplexer and a 5 stage binary counter. This circuitry would accommodate phase slippage of plus or minus 8 time slots.

It is well known that the sampling of an asynchronous signal by a regenerative flop flop may result in a situation where the flip flop's output "hangs" in the middle of the logic swing for an extended period of time. Such a condition is known as "metastability", and it generally occurs when the signal being sampled is somewhere in the middle of a transition when it is sampled. The analogy of a metastable state is standing a pencil on its point and seeing how long it takes to fall. Because a metastable state is neither a 1 nor a 0, it can cause subsequent digital circuitry to make grossly incorrect decisions, especially if the metastable signal is interpreted as a 1 by one set of gates and as a 0 by another set of gates. Just as the pencil doesn't normally stay upright for very long, the probability that a flip-flop will stay in a metastable state for very long is very small. However, we must recognize that the time interval of reference in a synchronous system is the clock period here an exceedingly small 10 nanoseconds. The probability that a flip-flop will still be in a metastable state 10 nanoseconds after being clocked is not insignificant. The probability of a metastable state causing a gross malfunction in an asynchronous system cannot be reduced to zero, given a finite signal processing time. Analysis have spent much time proving that many clever circuits conceived by others cannot do this. However, intelligent defense in the form of various metastability "obstacle courses", can be devised to reduce the proability of a malfunction to a reasonably insignificant level- perhaps one malfunction a year in a circuit clocked at 100 MHz.

The most obvious defense is to give the circuit as much time as possible to fall into a legitimate state. In a synchronous system with a fixed high-speed clock, this can be done by pipelining the data flow, with many re-sampling operations. The four stages of pipelining in the quartet sampler of FIG. 3 contribute strongly to immunity from metastability effects in this DPA. The resampling in the control circuit of FIG. 5 constitutes at least one more effective stage of pipelining in the control decision-making process. Furthermore, the control algorithm's requirement to two agreeing disagreements prior to action greatly reduces the probability of an erroneous command being sent to the counter as a result of metastability.

While a chain of identical master-slave flip-flop with identical master and slave sections can greatly improve metastability resistance through pipelining and the attendant increase in effective time of the process, further improvement is possible by modifying the flop-flops themselves. First, it is desirable that the regenerative circuits in the flip-flops have the highest possible gain-bandwidth, thus shortening the time it takes noise and-/or a given circuit imbalance to cause the circuit to fall into a legitimate state. This optimization may actually make the flip-flop slower in terms of the traditional measures of set-up time and clock-to-output delay, but those parameters are not as important in this situation. Further improvement can be achieved by identifying the output voltage of the flip-flop when the stage is most metastable (i.e., nearest its "balance point") and making sure that is different from the input voltage of the next stage that would bring that stage closest to its balance point. This deliberate stage-to stage "offsetting" process can be exercised between master and slave of a given flip-flop and between the output stage on one flip-flop and the input stage of the next.

The last metastability defense is implemented by changing the switching threshold of the Exclusive-Nor gate in the quartet sampler of FIG. 3 when the corresponding disagreement control channel of FIG. 5 has become armed. Recall that the control algorithm requires two like disagreements in sequence to act. The probability of two independent metastable states occurring one after the other to satisfy this condition is infinitesimal. It is more likely that the identical set of signal conditions could exist close together in time, stimulating the same type of metastability scenario to occur twice in a row. Modifying the switching threshold once the control circuit is armed breaks up this possibility. The ARM signals from the control circuit of FIG. 5 applied to the gates 25 of FIG. 3 accomplish this changing of the switching thresholds after the corresponding control channel has become armed as a result of the first disagreement signal. The Exclusive-Nor gates 25 are ordinary Exclusive-Or gates with an output inverter whose threshold is adjusted by the $\overline{ARM}$ signals by electronically altering the relative sizes of its P and N channel transistors.

While the invention has been described in connection with illustrative embodiments, obvious variations therein will occur to those skilled in the art without the exercise of invention, accordingly the invention should be limited only by the scope of the append claims.

What is claimed is:

1. A phase aligner circuit for synchronizing a phase-varying input data stream with a local clock comprising;

means for sampling the the phase-varying input data stream at a plurality of phases, with respect to the clock, and for generating disagreement signals indicating the occurrences of data transitions between any pair of sampling phases, first register means for storing simultaneously over a plurality of bit intervals a sequence of in-phase samples of the input data stream, second register means for storing simultaneously over a plurality of bit intervals a sequence of anti-phase samples of the input data stream, and control means for analyzing said disagreement signals and for causing samples stored in said first or said secod register means to be conected to the output of the aligner circuit.

2. A phase aligner circuit in accordance with claim 1 wherein said means for sampling includes means for sampling at four quadrature points of a local reference clock.

3. A phase aligner circuit in accordance with claim 2 wherein said means for sampling at said quadrature points includes a plurality of exclusive OR gates.

4. A phase aligner circuit for synchronizing an incoming binary data stream with a local clock comprising a multiphase sampler circuit having as inputs the data stream and four quadrature phases of the local clock, said sampler circuit including means for producing signals responsive to said data stream and said local clock phases, a biphase register circuit providing an aligned bit stream output from multiple possible register taps and having as inputs, from said sampler circuit, in-phase and anti-phase data samples with respect to the local clock, and a control circuit responsive to patterns of said signals from said sampler circuit to determine the register tap in said biphase register circuit from which the aligned bit stream output is taken.

5. A phase aligner circuit in accordance with claim 4 wherein said sampler circuit means for producing signals comprises means for generating disagreement signals when time adjacent quadrature samples of the input data stream disagree.

6. A phase aligner circuit in accordance with claim 5 wherein said biphase register circuit includes shift register means and a counter and said control circuit includes means responsive to patterns of said disagreement signals for applying up and down signals to said counter to vary the shift register tap from which the output is taken.

7. A phase aligner circuit in accordance with claim 6 wherein said shift register means includes a pair of shift registers, each having a plurality of output taps, one of said shift registers receiving at its input the in-phase data sample from said sampler circuit and the other of said shift registers receiving at its input the anti-phase data signal from the sampler circuit.

8. A digital phase aligner for synchronizing an incoming digital data stream with a local clock, comprising:

means to sample and time align said data stream at four quadrature phases of said local clock to obtain four samples, A, B, C and D representing the sampling points 0, 90, 180 and 270 degrees, respectively;

means to perform an exclusive OR operation on each adjacent pair of said sample to obtain the disagreement signals W, X, Y and Z;

a pair of similar shift registers having the said A and C samples applied to the serial inputs thereof, a multiplexer, an UP/DOWN binary counter, the reading of which controls said multiplexer which selects one of the stages or taps of said shift registers for application to the output of the digital phase aligner, the least significant bit of said counter determining from which shift register the output is taken, and a control circuit having as inputs said W, X, Y and Z signals and the least significant bit (LSB) signal from said counter, said control circuit comprising logic means to analyze said disagreement and LSB signals and provide either an UP or DOWN counter control signal upon phase slippage of said data stream relative to said local clock to thereby change the shift register tap from the said A sample to the said C sample, or vice versa.

9. The phase aligner of claim 8 wherein said logic means of said control circuit comprises means to detect when the selected sample point being applied to the said output of said aligner is approaching a data transition and means in response thereto to select another tap on said shift registers for which the sample point is more closely centered within the same time slot.

10. The digital phase aligner of claim 8 wherein said shift registers each have 8 stages, the first shift register to which the said C samples are applied having even numbered stages or taps 0-14 and the second shift register to which said A samples are applied having odd numbered taps 1-15, and wherein said multiplexer has its 16 inputs connected in numerical order 0-15 to said taps of said shift registers, and wherein the said counter is a 4 stage binary counter the output of which determines which of said 16 taps is connected to the said output of the aligner, and wherein said logic means of said control circuit comprises means to produce an UP signal upon two consecutive Y disagreements if LSB equals binary 0, said control circuit further comprising means to produce a Down signal upon two consecutive X disagreements if LSB is binary 0 or upon two consecutive Z disagreements if LSB is binary 1.

11. The digital phase aligner of claim 8 wherein said logic means of said control circuit will cause a change in the current selected sample applied to the said output of the aligner if there is an adjacent quadrature sample which disagrees with the said current sample, and if the current selected sample is the C sample and the said B sample is in disagreement therewith, the said logic means will produce a Down signal to change the selected sample to the A sample of later time, and if the current selected sample is the C sample and the said D sample is in disagreement therewith, the said logic means will produce an UP signal to thereby change the selected sample to the A sample of earlier time in the input data stream, and if the current selected sample is the A sample and said B sample is in disagreement therewith, said logic means will produce an UP signal to change the selected sample to the C sample of an earlier time, and if the current selected sample is the said A signal and the said D sample is in disagreement therewith, said logic means will produce a Down signal to thereby change the selected sample to the C sample of a later time within said input data stream.

12. A digital phase aligner for synchronizing an incoming digital data stream with a local clock comprising;
means to obtain four time-aligned samples A,B,C and D of said stream at four quadrature phases of said local clock, said samples representing respectively the sampling points 0, 90, 180, and 270 degrees,
means to perform modulo-2 addition on each adjacent pair of said samples to obtain four disagreement signals,
a pair of similar shift registers having the said A and C samples applied to the serial inputs thereof,
a multiplexer having a number of inputs, N, equal to the total number of stages of both of said shift registers, said multiplexer having its said inputs connected in interleaved fashion to said stages of said shift registers, the single output of said multiplexer comprising the output of the aligner,
an UP/DOWN counter capable of counting up to N having its output connected to said multiplexer as a control signal whereby said multiplexer connects its input line corresponding to the reading of said counter to said aligner output, whereby each time that said counter is incremented or decremented by one count the said sample applied to the said aligner output will change from the C sample to the A sample, or vice versa, and
a control circuit having as input signals said four disagreement signals and the least significant bit (LSB) signal of said counter, said control circuit comprising logic means to analyze its said input signals and to provide either an UP or Down signal to said counter upon phase slippage of said data stream relative to said local clock to thereby change the shift register tap which is connected to said aligner output through said multiplexer in such a way that if the sampling point of a currently selected sample is approaching a data transition, a shift register tap representing the other of said A or C samples in which the same data is approximately centered will be selected for connection to said aligner output.

13. The digital phase aligner of claim 12 wherein each of said shift registers has 8 stages and said counter has, 4 stages.

14. The digital phase aligner of claim 12 wherein each of said shift registers has 16 stages and said counter has 5 stages.

15. A digital phase aligner for synchronizing an incoming binary data stream with a local clock, comprising;
means to obtain samples of said incoming data stream at four quadrature phases 0, 90, 180, and 270 degrees, of said local clock over a plurality of bit intervals,
means to load said 0° and 180° samples over said plurality of bit intervals into the serial inputs of different plural-stage shift registers which are clocked by said local clock,
a control circuit for determining the relative phase of said input data stream relative to said local clock by logical analysis of the samples of said incoming data at said four quadrature phases,
and means to connect one of the stages of one of said plural-stage shift registers to the output of the aligner depending on the results of said logical analysis.

* * * * *

UNITED STATES PATENT AND TRADEMARK OFFICE
CERTIFICATE OF CORRECTION

PATENT NO. : 4,756,011

DATED : July 5, 1988

INVENTOR(S) : Robert R. Cordell

It is certified that error appears in the above-identified patent and that said Letters Patent is hereby corrected as shown below:

Column 7, line 28, change "16 pk register" to --16 register--.

Signed and Sealed this

First Day of January, 1991

Attest:

HARRY F. MANBECK, JR.

*Attesting Officer*     *Commissioner of Patents and Trademarks*